United States Patent [19]

Reid

[11] 4,119,019

[45] Oct. 10, 1978

[54] WATER REPLENISHING DEVICE FOR COFFEE MAKERS

[76] Inventor: William P. Reid, 3200 E. 29th St., Long Beach, Calif. 90806

[21] Appl. No.: 816,350

[22] Filed: Jul. 18, 1977

Related U.S. Application Data

[63] Continuation of Ser. No. 653,291, Jan. 29, 1976, abandoned.

[51] Int. Cl.$^2$ ............................................. A47J 31/06
[52] U.S. Cl. ..................................... 99/306; 99/317; 210/481; 422/266; 422/277; 422/15
[58] Field of Search ............... 426/433; 210/473–482, 210/181, 190, 244, 246, 248, 484, 485, 282, 285, 286; 99/277.1, 300, 279, 286, 317, 306; 23/272 R, 272.6 R, 272.5

[56] References Cited

U.S. PATENT DOCUMENTS

| 370,583 | 9/1887 | Close | 210/248 |
|---|---|---|---|
| 1,014,843 | 1/1912 | Nobles | 210/473 |
| 1,889,485 | 11/1932 | Martin | 210/476 |
| 2,248,766 | 7/1941 | Landesman | 229/44 M |
| 3,136,617 | 6/1964 | Wächter | 210/282 |
| 3,793,692 | 2/1974 | Tate et al. | 210/484 |
| 3,823,824 | 7/1974 | Close | 210/248 |

Primary Examiner—Frank Sever
Attorney, Agent, or Firm—Paul A. Weilein

[57] ABSTRACT

A funnel-shaped receptacle is temporarily positioned on the top of a coffee-making machine with its bottom outlet positioned to discharge into the heater tank of the machine. The interior of the receptacle is spanned by a disposable activated carbon filter and below the filter is a container of screen material filled with soluble phosphate granules. Replenishing water poured through the receptacle is first purified by the filter and is then treated with the dissolved phosphate to prevent calcium formation and corrosion in the heater tank.

7 Claims, 4 Drawing Figures

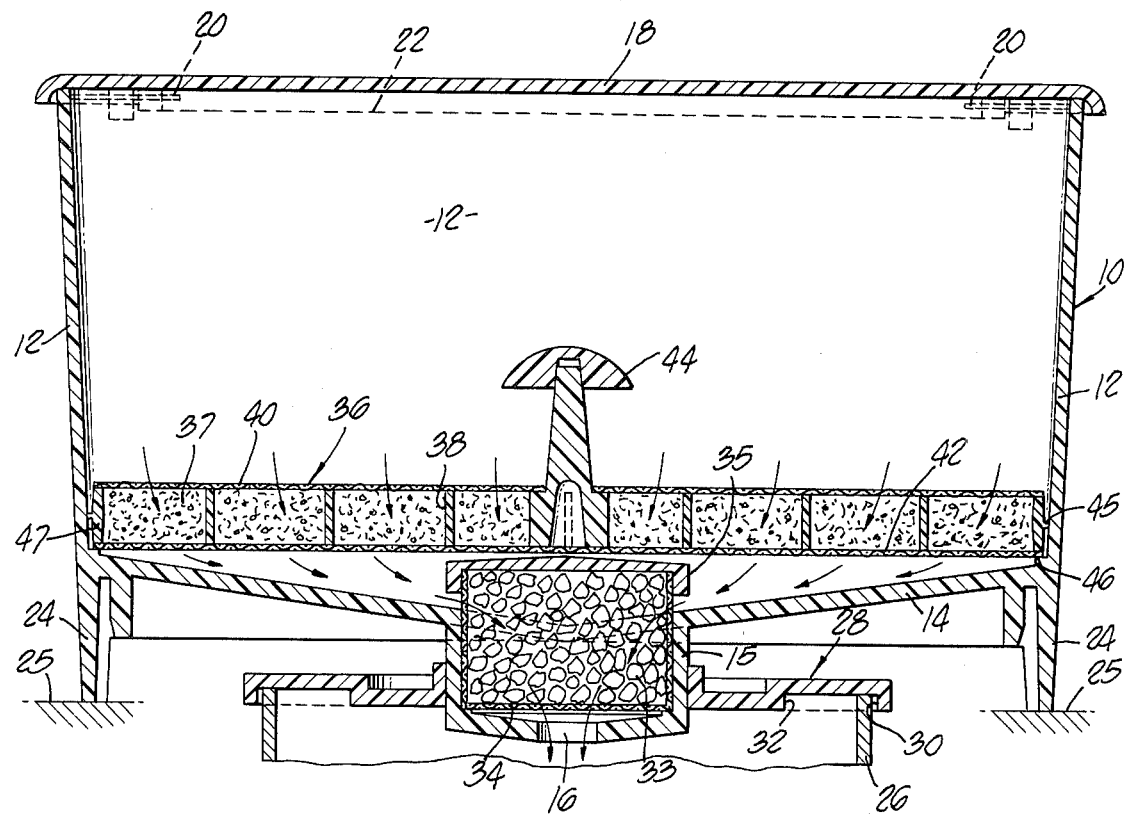
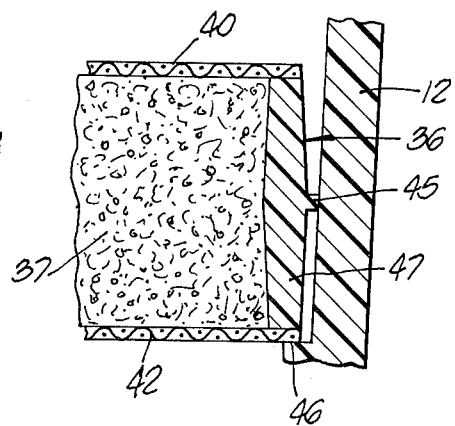

WATER REPLENISHING DEVICE FOR COFFEE MAKERS

This is a continuation of application Ser. No. 653,291, filed Jan. 29, 1976, now abandoned.

BACKGROUND OF THE INVENTION

This invention relates to coffee makers and more particularly is directed to a device for replenishing a commercial coffee maker with treated water.

Untreated tap water is not satisfactory for replenishing coffee making machines because tap water has various impurities which adversely affect the taste and aroma of coffee. Using replenishing water from a tap that is equipped with an efficient filter produces coffee of satisfactory flavor but, unfortunately, tap water or filtered tap water causes lime scale formation and, in addition, causes corrosion of interior surfaces of a coffee making machine, especially the hot surfaces of heating elements. For this reason, it is advisable not only to filter tap water, but also to treat the filtered tap water to prevent scale formation and corrosion. The problem, therefore, is to provide a conveniently usable water replenishing device that not only filters tap water, but also treats the water for the protection of the coffee making machine against scale formation and corrosion.

SUMMARY OF THE INVENTION

One object of the invention is to provide a water-treating replenishing procedure for a coffee making machine that can be carried out in a convenient and expeditious manner. This object is accomplished by providing what may be termed a "pour-through" receptacle which may be manually positioned on the coffee making machine to permit untreated tap water to be poured through the receptacle directly into the heater tank of the coffee making machine.

Another object of the invention is to provide such a pour-through receptacle which both filters impurities out of the replenishing tap water and treats the tap water to inhibit scale formation and corrosion in the coffee making machine. For this purpose the body of the pour-through receptacle is of the general character of a funnel that is open at the top to receive replenishing water and narrows down to a discharge outlet. A suitable disposable filter cartridge spans the interior of the funnel and at a lower level a suitable permeable container is filled with soluble granules that release phosphate material into the flowing water.

Soluble granules for this purpose are sold under the trademark "MICROMET" and are available from the Calgon Corporation, Pittsburgh, Pennsylvania, a subsidiary of Merck and Co., Inc. "MICROMET" is a slowly soluble food grade hexametaphosphate that is perfectly safe for use in the treatment of drinking water.

The hexametaphosphate prevents lime scale formation by keeping the hardness particles of the water separated to keep them from precipitating and also prevents iron stains by holding dissolved iron in solution. The hexametaphosphate effectively controls corrosion by forming a thin protective film on all interior metal surfaces of the coffee making machine. The protective film must be continually rebuilt to provide continuing protection, but repeated use of the pour-through receptacle serves that purpose. Fortuitously, the protective film is not cumulative because it does not build up on itself and therefore it does not appreciably interfere with the efficiency of the heating elements of the heater tank of the coffee making machine.

Another object of the invention is to provide such a pour-through water-replenishing receptacle that may be relied upon for top performance on each cycle of its use. The device employs an activated carbon filter cartridge that is disposable and is replaced for each operating cycle. The soluble phosphate granules in the permeable container are also replaced for each operating cycle. Sustained effectiveness of the soluble phosphate granules throughout each operating cycle is assured by providing space in the permeable container above the level of the flowing water to hold a reserve supply of the granules. As the granules in the lower part of the permeable container are dissolved into the flowing water, they are replaced by gravitation of granules from the elevated reserve supply.

A further object of the invention is to provide a disposable activated carbon filter cartridge with a filter bed of uniform thickness, which cartridge may be handled and shipped without affecting the uniform thickness of the filter bed. The body of the filter cartridge incorporates a grid that divides the filter bed into numerous compartments. With each compartment filled with the carbon particles, the carbon particles are effectively captivated against undue shifting.

The invention teaches that such a disposable filter cartridge can be manufactured economically out of plastic material, preferably polypropylene (homopolymer). A screen of the plastic material is bonded to one side of the grid and then the compartments formed by the grid are filled with the activated carbon particles. Finally, a second screen of the plastic material closes the compartments to result in a carbon filled plastic grid sandwiched between two plastic screens. The two plastic sceens may be bonded to the grid, for example, by friction welding or by sonic welding.

A certain problem arises in that the replaceable filter cartridge must be sealed around its periphery to prevent the newly added water from bypassing the filter. The invention insures that whenever a new filter cartridge is installed, it is automatically sealed in place. For this purpose, the disposable plastic filter cartridge is formed with a continuous resilient sealing rib around its periphery and the interior of the body of the pour-through receptacle is tapered downwardly to a stop shoulder that seats the disposable cartridge. Forcing the filter downward to seat against the stop shoulder causes a wedging action against the sealing rib that effectively compresses the rib to result in a water-tight seal around the seated cartridge.

The preferred practice of the invention is further characterized by the concept of providing the pour-through receptacle with an adapter plate which replaces the usual cover of the heater tank of a coffee making machine and serves not only to minimize heat losses, but also to prevent free entry of atmospheric air into the heater tank. The adapter plate is slidingly mounted on the funnel-shaped body of the pour-through receptacle for adjustment relative to the rim of the heater tank and is constructed to cooperate with heater tanks of different diameters.

The features and advantages of the invention may be understood from the following detailed description and the accompanying drawings.

BRIEF DESCRIPTION OF THE DRAWINGS

In the drawings, which are to be regarded as merely illustrative:

FIG. 2 is a longitudinal vertical section of the device as seen along the line 2—2 of FIG. 1;

FIG. 4 is an enlarged section of a portion of the disposable filter cartridge showing the continuous sealing rib that prevents the replenishing water from bypassing the filter cartridge.

DESCRIPTION OF THE PRESENTLY PREFERRED EMBODIMENT OF THE INVENTION

Figure 1:
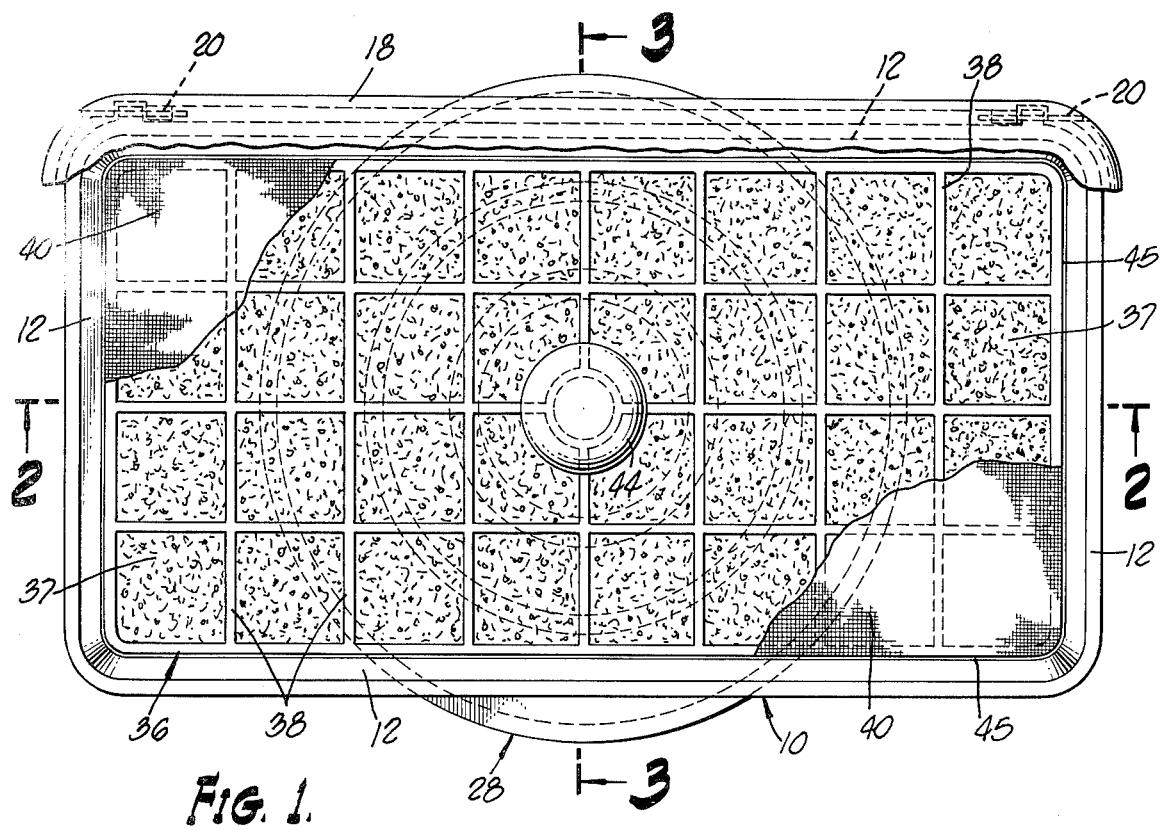
FIG. 1 is a plan view of the presently preferred embodiment of the water-replenishing device.

Referring to the drawings, a water-replenishing receptacle, generally designated 10, is of rectangular plan configuration and is of the general character of a funnel. The receptacle has four side walls 12 and a bottom wall 14 that inclines downwardly to a central cylindrical well 15 and the discharge opening 16 of the receptacle is in the bottom of the well.

Figure 3:
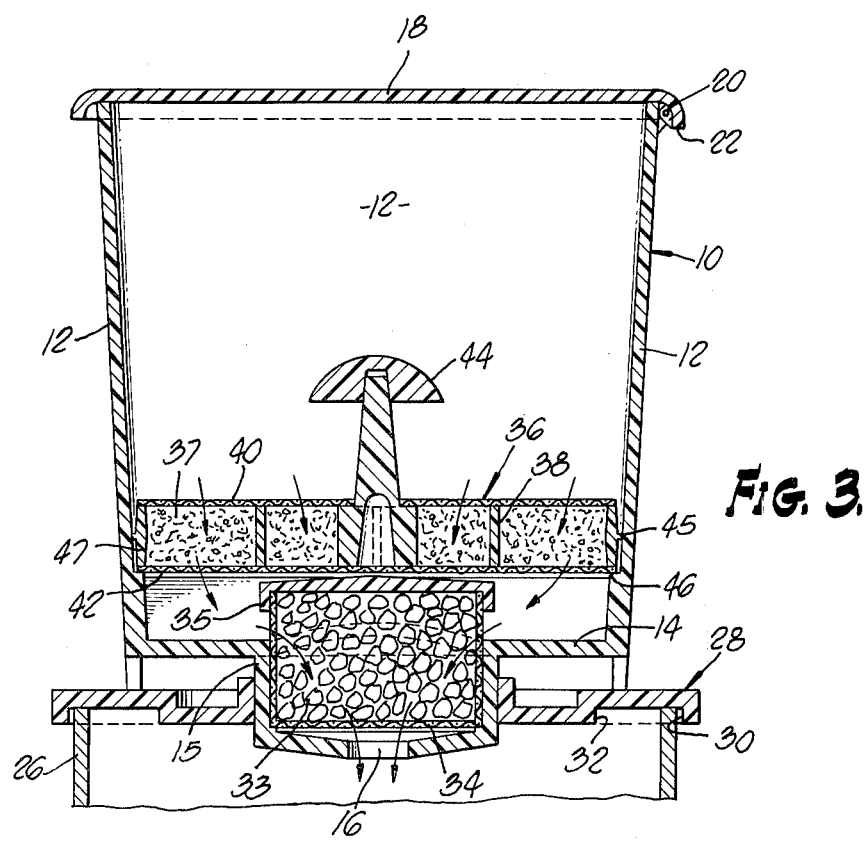
FIG. 3 is a transverse vertical section along the line 3—3 of FIG. 1.

The receptacle 10 has a rectangular lid 18 which is mounted on a pair of hinge pins 20 and is suitably biased to closed position. In the construction shown, the lid 18 has a rear flange 22 (FIG. 3) near the hinge pins 20 which prevents the lid from being lifted as far as a vertical position so that if the lid is manually opened and then released it gravitates back to its closed position.

The receptacle 10 is formed with bottom flanges 24 at its opposite ends which serve as legs so that, as indicated in FIG. 2, when the receptacle is in use the bottom flanges 24 support the receptacle on the upper surface 25 of a coffee making machine with the discharge opening 16 of the receptacle directly above the heater tank 26 of the coffee making machine. Slidingly embracing the cylindrical well 15 of the receptacle 10 is an adapter plate 28 which may be adjusted downwardly to serve as a cover for the heater tank 26. As shown in FIG. 2, the adapter plate has a radially inwardly facing circumferential shoulder 30 which is dimensioned to telescope over the rim of a heater tank 26. The adapter plate also has a radially outwardly facing circumferential shoulder 32 of smaller diameter which may telescope into the rim of a heater tank that is of smaller diameter than the heater tank 26. In serving as a cover for the heater tank 26, the adapter plate minimizes loss of heat from the heater tank and also prevents the free flow of atmospheric air into the tank.

Seated in the cylindrical well 15 is a permeable container 34 to hold a charge of granules 33 of the previously mentioned hexametaphosphate product. In this embodiment of the invention the permeable container 34 is a cup-shaped receptacle made of metal screen of sufficiently fine mesh to retain the phosphate granules 33. The cup-shaped screen container 34 is bonded to the surrounding wall of the cylindrical well and is provided with a removable cover 35. An initial charge of the phosphate crystals 33 substantially completely fills the permeable container 34 and extends upward into the interior of the cover 35.

Just above the permeable container 34, the interior of the receptacle 10 is spanned by a disposable filter cartridge 36 that is filled with activated carbon 37. An operating cycle is carried out simply by pouring replenishing water into the receptacle 10, the water percolating through the filter cartridge and flowing through the phosphate crystals 33 in the permeable container 34. it is to be noted that the inclined bottom wall 14 of the receptacle 10 joins the cylindrical well 15 at a level well below the cover 35 so that the phosphate granules 33 held in reserve in the upper part of the permeable container are above the water level. By virtue of this arrangement, water poured through the device flows through the lower part of the permeable container 34 and as the phosphate granules 33 in the lower part of the container dissolve into the flowing water, they are replaced by gravitation into the lower part of the permeable container of the initial reserve supply of the granules 33 above the level of the flowing water.

The filter cartridge 36 may be of various constructions in various practices of the invention. In this particular embodiment the filter cartridge comprises a grid 38 of polypropylene (homopolymer) with a screen 40 on the upper side of the grid and a screen 42 on the lower side of the grid. The two screens may be made of the same plastic material as the grid and are suitably bonded to the grid, for example by friction welding or by ultrasonic welding. The two screens 40 and 42 may be, for example, of 60–100 mesh. The filter cartridge 36 is provided with a suitable handle 44 which may be of the same plastic material and which is suitably bonded to the grid 38. As may be seen in FIGS. 1 and 2, the grid 38 divides the interior of the filter cartridge into numerous rectangular compartments and it is contemplated that the rectangular compartments will be filled with the activated carbon particles 37 to keep the carbon filter bed from shifting during the handling and shipment of the cartridge.

It is essential that an effective seal be provided around the periphery of the filter cartridge 36 to prevent the replenishing water from bypassing the filter bed. A feature of the invention is that the filter cartridge has a continuous peripheral resilient rib 45 which is integral with the grid 38 and which automatically provides the required peripheral seal in response to manual installation of the filter cartridge in the receptacle 10. For example, the sealing rib 45 may be 0.032 inch thick and 0.030 inch wide. As may be seen in FIGS. 2 and 3, the bottom of the filter cartridge 36 seats on a continuous shoulder 46 of the receptacle 10. The four side walls 12 of the receptacle are inclined 3° from vertical so that forcing a filter cartridge downward against the seating shoulder 46 results in a wedging action that compresses the sealing rib between the grid of the filter and the surrounding walls of the receptacle. As shown in FIG. 4, the peripheral wall 47 of the grid is tapered below the sealing rib 45.

The manner in which the described water-replenishing device serves its purpose may be readily understood from the foregoing description. In preparation for an operating cycle the permeable container 34 is filled with a charge of the phosphate granules 33 and then the cover 35 is placed on the container 34. The filter cartridge 36 is then installed and seated against the shoulder 46 with consequent effective compression of the sealing rib 45. With the usual cover (not shown) of the heater tank 26 removed, the receptacle 10 is positioned on the upper surface 25 of the coffee making machine as shown in FIG. 2 and the adapter plate 28 is fitted over the rim of the heater tank to replace the usual cover. The lid 18 of the receptacle 10 is then opened temporarily to admit a quantity of replenishing water, the lid then being permitted to gravitate back to closed position.

The operating cycle is carried out automatically by the replenishing water flowing through the filter cartridge 36 and through the granular phosphate 33 in the permeable container 34, the treated water pouring through the discharge opening 16 into the interior of the heater tank 26. After an operating cycle is completed, the water-replenishing receptacle may be removed from the coffee making machine, or if desired, the receptacle may be left in place since the adapter plate 28 effectively covers the heating tank 26. In preparation for a new operating cycle, the filter cartridge is removed and the cover 35 is removed from the permeable container 34. A new charge of phosphate granules 33 is deposited in the permeable container 34 and the cover 35 is replaced. A new filter cartridge 36 is then installed in the hollow receptacle 10.

The description in specific detail of the presently preferred embodiment of the invention will suggest various changes, substitutions and other departures from the disclosure within the spirit and scope of the appended claims.

What is claimed is:

1. A filtering unit assembly for use in supplying replenishing water to the upper end of a heater tank of a coffee making machine, comprising:

an upstanding water receiving receptacle having downwardly converging side walls portions joined with an integral bottom wall;

said bottom wall being formed to provide a central depending well having a bottom wall with a discharge opening therein;

a container for soluble granules which release phosphate material, said container being seated in said well over said discharge opening and having permeable bottom and side wall portions for conducting water from the receptacle through said permeable side wall portion and through the container to said discharge opening; and filter means spanning the bottom interior of the receptacle above said container for removing undersirable constituents from the water supplied from the receptacle to the heater tank, said filter means comprising a one-piece outer frame structure having an integral peripheral rib thereabout, said frame structure being constructed of a material which is sufficiently deformable to provide a water-tight seal between said rib and said wall portions.

2. A filtering unit as set forth in claim 1 in which a separate adapter plate removably supports said filtering unit on the heater tank, and is formed with a portion that surrounds and slidably embraces the depending well of the receptacle so as to serve as a cover for the heater tank of the coffee making machine to minimize heat losses from the heater tank and to prevent the free admission of atmospheric air into the heater tank.

3. A filtering unit as set forth in claim 1 in which said permeable container has a removable cover for diverting water flow through the side wall of the container below the cover.

4. A filtering unit as set forth in claim 1, in which said filter means is peripherally removably supported on the adjacent walls of said receptacle said bottom wall slopes downwardly from opposite sides of the receptacle and cooperates with the filter to form a water flow chamber of increasing capacity towards the upper end of the permeable container.

5. A filtering unit as set forth in claim 1, in which the filter means comprises a rectangular grid frame structure with a plurality of compartments for receiving a filtering medium, and is supported upon an internal shoulder formed on the receptacle walls.

6. A filtering unit as set forth in claim 5 in which upper and lower screens respectively extend over the upper and lower ends of the grid compartments.

7. A filtering unit as set forth in claim 1, in which the sealing means comprises a peripheral projecting compressible rib; and in which the frame structure below the rib is downwardly tapered.

* * * * *